United States Patent [19]
Taglione et al.

[11] Patent Number: 6,061,748
[45] Date of Patent: May 9, 2000

[54] METHOD AND APPARATUS FOR MOVING DATA PACKETS BETWEEN NETWORKS WHILE MINIMIZING CPU INTERVENTION USING A MULTI-BUS ARCHITECTURE HAVING DMA BUS

[75] Inventors: John V. Taglione, Scarboro; Patrick K. Kam, Pickering, both of Canada

[73] Assignee: International Business Machines Corp., Armonk, N.Y.

[21] Appl. No.: 08/995,660

[22] Filed: Dec. 22, 1997

[51] Int. Cl.[7] .................................................... G06F 13/28
[52] U.S. Cl. .............................. 710/22; 710/27; 710/128; 370/276
[58] Field of Search .............................. 710/128, 22, 27; 370/450, 397, 276; 341/50; 711/169

[56] References Cited

U.S. PATENT DOCUMENTS

| | | | |
|---|---|---|---|
| 5,410,652 | 4/1995 | Leach et al. ............................. | 370/450 |
| 5,623,494 | 4/1997 | Rostoker et al. ....................... | 370/397 |
| 5,655,151 | 8/1997 | Bowes et al. ............................. | 710/22 |
| 5,745,684 | 4/1998 | Oskouy et al. ......................... | 709/250 |
| 5,889,480 | 3/1999 | Kim .......................................... | 341/50 |
| 5,907,864 | 5/1999 | Potts et al. ............................... | 711/169 |

Primary Examiner—Thomas C. Lee
Assistant Examiner—Harold Kim
Attorney, Agent, or Firm—Douglas W. Cameron; Anne Vachon Dougherty

[57] ABSTRACT

The invention provides a data processing system comprising: a CPU; a system memory; a plurality of network interfaces; a CPU bus connected to the system memory and to each of the network interface for initialization and control of the network interfaces by the CPU; an individual DMA bus connected to each of corresponding network interfaces and to the system memory; each of the network interfaces is connectable to an external network, whereby data can be transferred by the data processing system from one network to another using system memory.

23 Claims, 12 Drawing Sheets

METHOD AND APPARATUS FOR MOVING DATA PACKETS BETWEEN NETWORKS WHILE MINIMIZING CPU INTERVENTION USING A MULTI-BUS ARCHITECTURE HAVING DMA BUS

FIELD OF THE INVENTION

This invention relates to a multi-bus architecture for computers used in data processing networks.

BACKGROUND OF THE INVENTION

In computer systems, which are used to bridge multiple data processing networks, the movement of data between the networks is performed by the CPU (Central Processing Unit) of the system which bridges one network to another. The speed of the transfer from one network to another is governed by the speed of the CPU. In the case of large amounts of data being transferred, the CPU will pose the limiting factor on the transfer throughput.

In these computer systems, direct memory access (DMA) or cycle stealing is used to off-load the task of moving data between computers, I/O (input-output) devices and the computer memory subsystem from the CPU. By using the computer's system bus, when it is not being used by the CPU, the DMA can increase the overall data throughput of the computer system. Memory accesses of the system are then shared between the CPU and the I/O devices. Even this DMA architecture has limitations as it too relies on the same single system bus for access to the memory subsystem. The contention between the CPU and the DMA for system resources still exists and limits the throughput of the system, and thus of any networks bridged by the computer system.

For example, in a 80186 CPU system clocked at 20 megahertz and supporting peripherals including a 10 Mbps (megabytes per second) Ethernet Controller and a 4 Mbps per second IR controller, when the Ethernet Controller and the IR controllers are both in operation, memory accesses are required every 570 nanoseconds. With the 80186 CPU clocked at 20 megahertz, the DMA must have access to the memory subsystem once every 3 CPU cycles. This is a 30% reduction in performance of the CPU and results in the I/O data rate quickly overrunning the system. Therefore, conventional DMA implementation is inadequate to provide the performance which is need in this example.

SUMMARY OF THE INVENTION

The invention herein overcomes the above limitations by separating the DMA data transfer traffic from the I/O and memory traffic in a data processing system. The DMA traffic can be removed from the system bus and moved directly to the memory subsystem by providing a second bus into the memory subsystem for the exclusive use of the DMA, while the CPU and I/O devices can still access the memory subsystem by using the system bus as in the single bus system.

The invention provides a data processing system comprising: a CPU; a system memory; a plurality of network interfaces; a CPU bus connected to the system memory and to each of the network interfaces for initialization and control of the network interfaces by the CPU; and an individual DMA bus connected to each of corresponding network interfaces and to the system memory; each of the network interfaces being connectable to an external network, whereby data can be transferred by the data processing system from one network to another using system memory.

Preferably, each network interface comprises a DMA controller and associated I/O controller, wherein the DMA controller is connected to an individual DMA bus, and said I/O controller is connectable to an external network.

In addition, another embodiment of the invention provides a method of transferring data between networks by means of a data processing system in which data is transferred by means of data packets; the data transfer being achieved under network interface control; transferring data to the system memory; processing the data header of each data packet by means of the CPU; as appropriate establishing a routing header for said data packet if the networks between which data is transferred are dissimilar; and initiating the DMA operation, transmitting a data packet to the other network, from the system memory.

The system DMAs are set up and controlled through the system bus. The overhead of arbitrating for the system bus is thereby removed from the DMA data transfer process. The only arbitration is required for the memory subsystem. The bandwidth of the memory subsystem must be increased to support the access of the system bus and the DMA bus in a transparent manner. This can be done at minimal cost increase by using faster memory in the memory subsystem than is typically used in the single bus system. This faster memory is now readily available.

BRIEF DESCRIPTION OF THE DRAWINGS

The invention will now be described with specific reference to the appended drawings wherein.

DETAILED DESCRIPTION OF THE INVENTION

Figure 1:
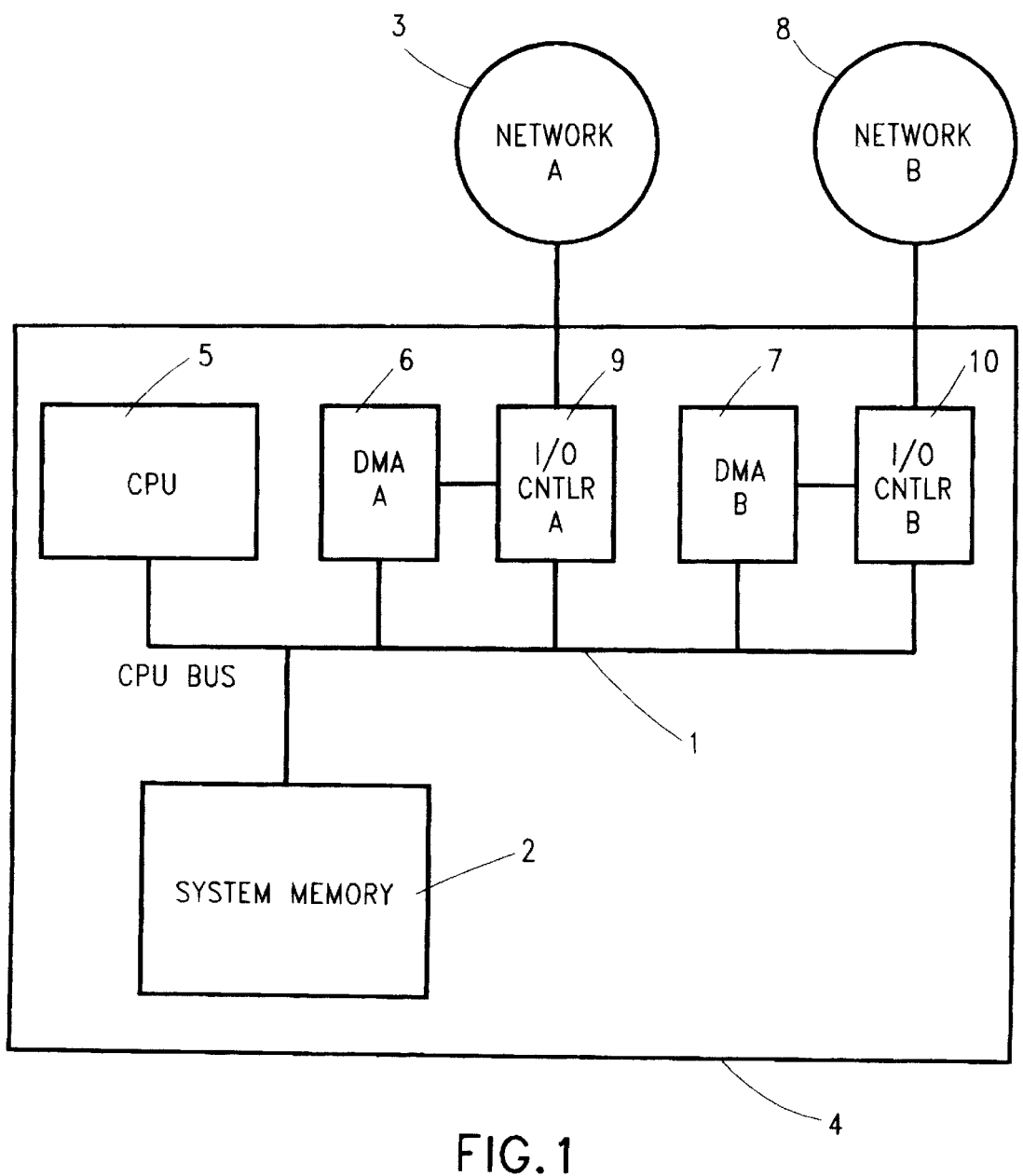
FIG. 1 depicts a block diagram of a typical single bus system in which the common bus system supports the I/O memory and DMA traffic.

Referring to FIG. 1, a block diagram is provided of a typical computer having a single bus architecture in which a common system bus 1 supports the I/O, memory, and DMA traffic. Performance issues arise from real time applications where data must be stored as it is received in the system memory 2.

When a data packet comes in from network A 3 to the computer system 4, it is done under the control of the I/O controller 9, as the data is being received from the network A3. The data packet is temporarily buffered in the I/O controller 9. The I/O controller 9 will interact with the DMA controller 6, indicating when data is available to be placed in the system memory 2. The data packet is placed into the system memory 2 under the control of the DMA A 6 and the DMA A 6 must arbitrate with the CPU 5 for access to the CPU bus 1 before it can put the data packet in the system memory 2. A data packet typically consists of a number of subparts, including a header and a data subpart.

Once the entire data packet has been stored in the system memory, the CPU 5 must then access the system memory 2, the CPU 5 must read the data in the system memory 2 including the packet header (which tells it where it's directed), and the CPU 5 must initialize the second DMA B 7. The CPU then starts the DMA process by initiating the DMA B 7 so that it can transfer data from the system memory 2 to network B 8 with the aid of I/O controller 10. DMA B 7 arbitrates with the CPU 5 for access to the bus and, as a result, will transfer the packet in a number of sections of several bytes at a time, working with I/O controller 10 until the packet is completely transferred to network B 8.

In the transfer of the data from network A, data packets are typically being sent at a constant rate. Accordingly, the computer system bridging the two networks A and B must be able to access the bus within a fixed amount of time so that the data packets can be successfully stored in the system memory. DMA B 7 and associated I/O controller B 10 must also send out data packets at a fixed rate so that it must be able to access the bus 1 and system memory 2 during a fixed period of time. When the rate of data being received overloads the computer system, receiver over-runs occur and correspondingly, if there is insufficient time for transmission of packets to network B 8, transmitter under-runs occur. Neither of these conditions are acceptable for good performance.

Figure 2:
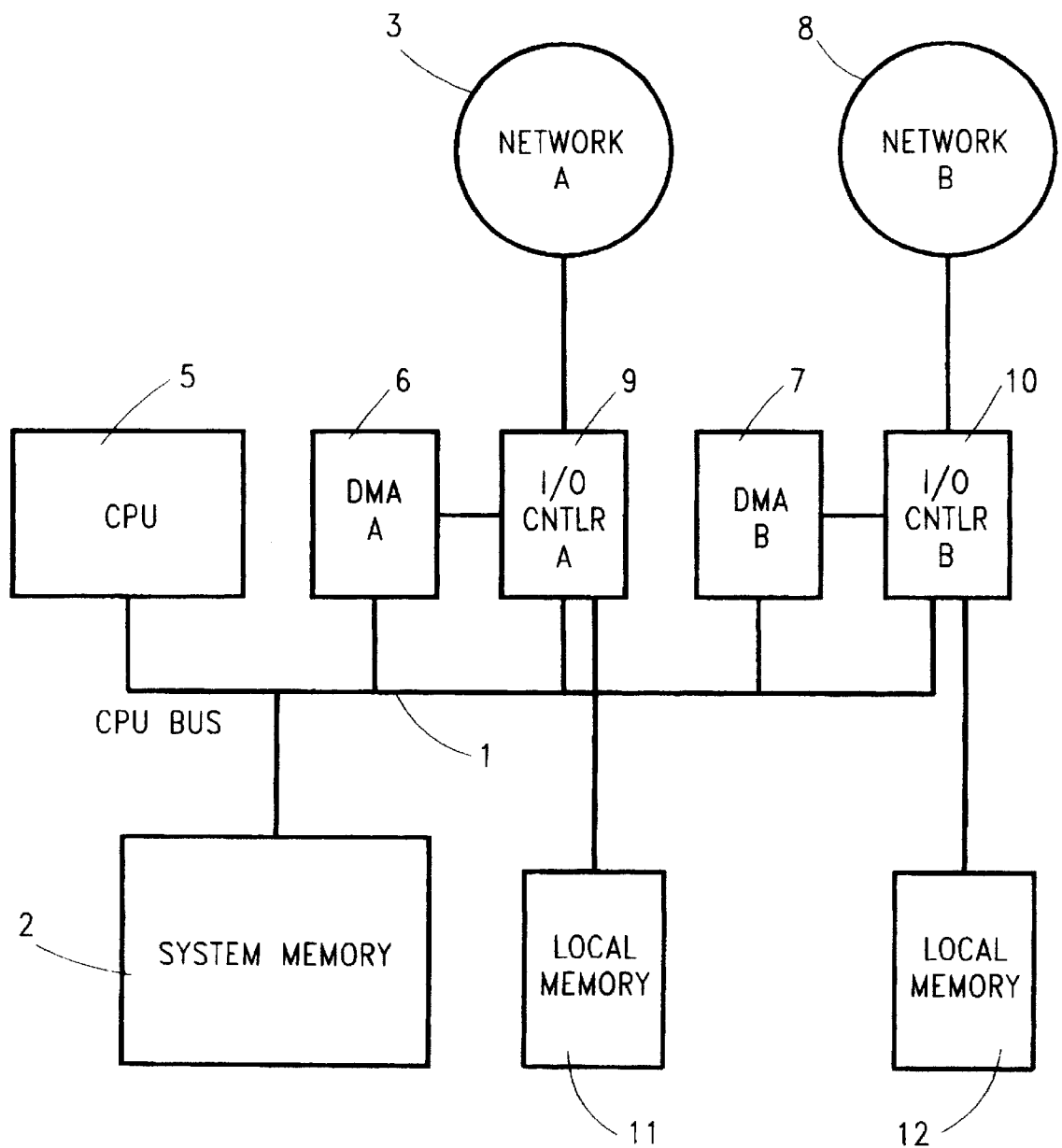
FIG. 2 also prior art, depicts a single bus system with local memory access.

Referring to FIG. 2, one solution, a shared memory architecture, is depicted for the reduction of over runs and under runs in the transfer of packets. In this case, local memory buffers 11, 12 are used to avoid this loss of data; however the penalty of this architecture involves a higher system cost as there are additional local memories 11, 12 required. As there is now dedicated memory to each I/O controller, the problem of over runs and under runs will not occur as often as in the previous system.

Dual Channel Approach The DMA controllers 6, 7 are implemented with two independent channels. The first channel is used to move data to and from the I/O controller 9, 10 from and to the local memory 11, 12. The second channel is used to move data to and from the local memory 11, 12 to and from the system memory 2.

A data packet received from network B 8 under DMA 7 control will be transferred into local memory 12 controlled by the corresponding I/O 10 controller. In order for the data packets in the local memory 12 associated with I/O controller B 10 to be transferred to network A 3, it first must be transferred under DMA control (DMA B 7) into the system memory 2 which requires arbitration for the bus by the DMA 7 with the CPU 5. Then, in order for the data packets to be transferred to network A 3, the CPU 5 is required to process the packets in the system memory 2, and set up and initiate DMA A 6 to transfer the data packets from the system memory 2 to the local memory 11 associated with the I/O controller A 9. Subsequently, I/O controller A 9 under DMA 6 control transfers the data from the local memory 11 to network A 3.

Single Channel Approach

The DMA controllers 6, 7 are implemented as single channel controllers. They are used in conjunction with the I/O controllers 9, 10 to move data to and from the networks 3, 4 from and to the local memory 11, 12.

An alternate method of operation of the system occurs in which a packet is being moved from network B 8 to network A 3. In this case, DMA B 7 controls the receipt and storage of the packet involved into local memory 12, then the CPU 5 uses the I/O controller B 10 to move the data packets from the local memory 12 to the system memory 2 where the CPU processes it in order to determine where it is to be sent. The CPU uses the system bus 1 to move the data packets into the local memory 11 from which the DMA A 6 moves the data packets from the local memory 11 to the I/O controller 9 which then sends it out to network A 3. The above description depicts how data transfers occur in a data processing system which operates in a shared memory mode, as the local memory associated with each of the I/O controllers is mapped into corresponding location(s) in system memory.

As described above, it can be seen that the use of local memory buffers avoids loss of data; yet causes additional penalties. The level of system integration which is possible is lowered because of the need for additional memory components for each I/O device. Even with additional memory buffers, the system performance issue is not fully addressed. The date which now resides in the local memory buffers must still be placed on the system bus to transfer it to the system memory before it can be accessed by the CPU. In the single channel approach, the CPU must do all of the data movement from local to system memory and back to local memory. In the dual channel approach, the DMA controllers 6, 7 must arbitrate for the CPU bus 1 with the CPU 5 and each other for access into the system memory 2. In both approaches, multiple copies of the data packets must be made in order to transfer the packet between the networks 3, which necessarily limits performance.

Figure 3:
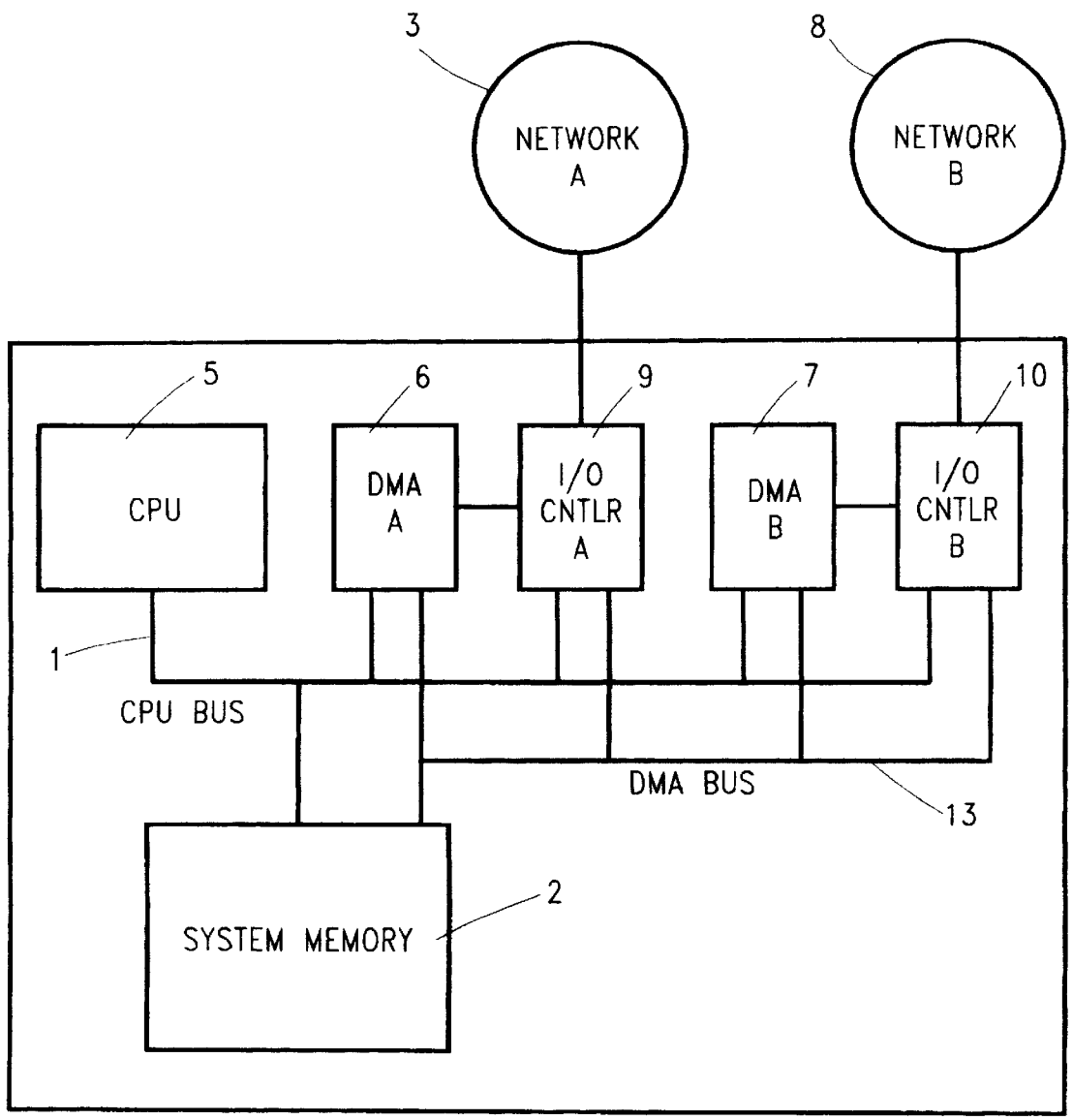
FIG. 3 depicts a data processing system with a multi-bus architecture in accordance with the invention here.

FIG. 3 illustrates a data processing system 4 in accordance with the invention for transferring data between two networks 3, 8. The data processing architecture of the system includes a CPU 5 and system memory 2 as well as an I/O controller 9, 10 with a dedicated DMA controller 6, 7 for each network. In addition, there are separate CPU and DMA buses. The CPU bus is connected between the CPU 5 and system memory 2 as well as to each of the I/O controllers 9, 10 and associated DMA controllers 6, 7. The DMA bus 13 is connected to the I/O controllers 9, 10 and their associated DMA 6, 10 controllers and to the system memory 2.

Figure 4:
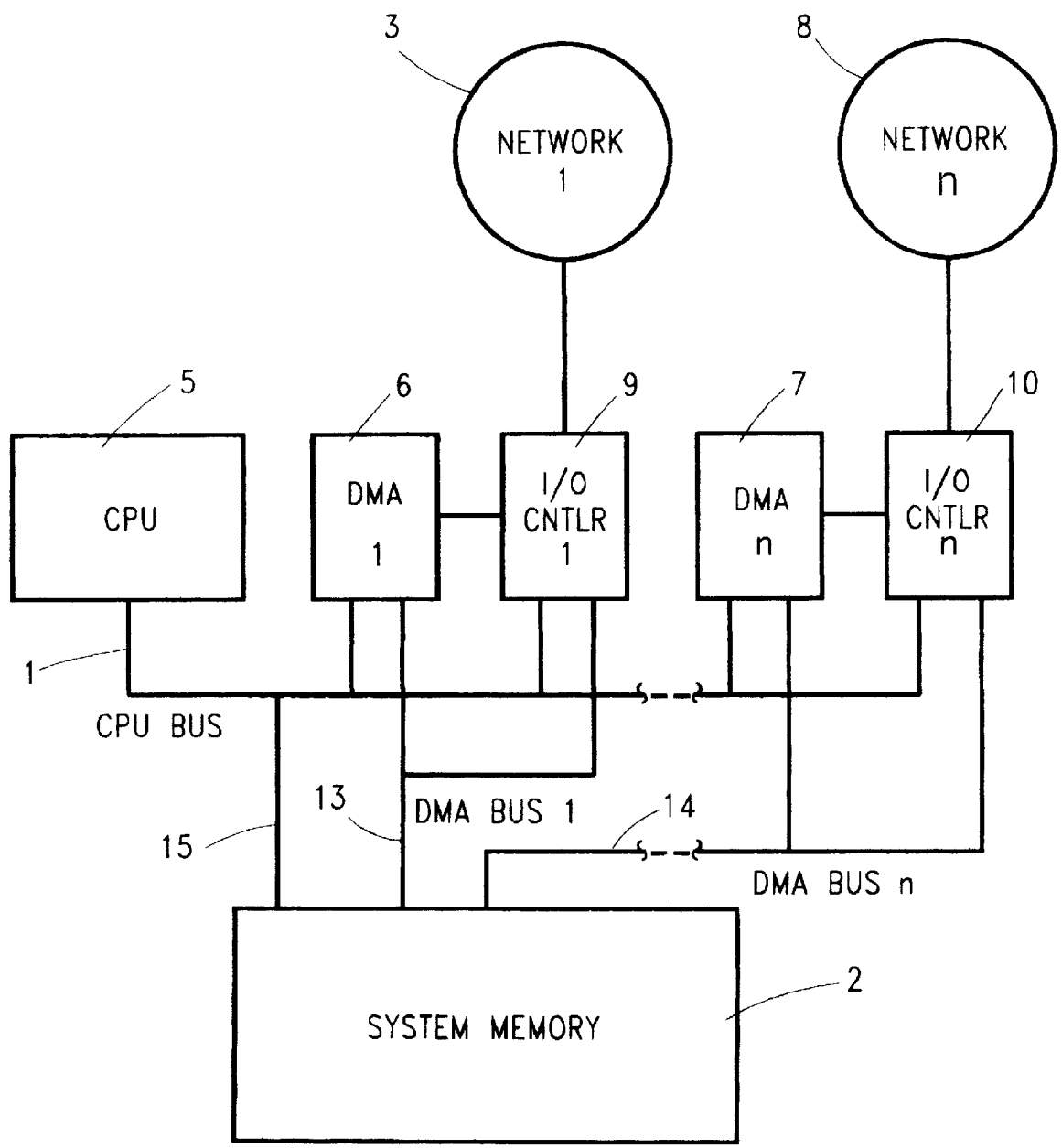
FIG. 4 depicts a multi-bus structure in accordance with the invention herein extended to cover n I/O DMA channels.

The embodiment of the invention depicted in FIG. 3 can be extended to the case of multiple networks as shown in FIG. 4 in which implementation the configuration is shown for n networks. The multiple processor DMA bus configuration indicated in FIGS. 3 and 4 has been optimized for data movement. In general, as is well known, a system which is used to link multiple networks, does very little or no processing of the data itself in the process of moving data between networks. Normally, the header of each packet is processed without processing data being carried by the packet.

The embodiment of the invention depicted attempts to maximize the efficiency of the movement of data in and out of the system memory 2. The hardware implementation depicted allows for the efficient movement through the use of multiple buses with the system memory. In normal design of computer systems, computer programming software, usually stored in system memory, is used by the CPU to control system of operation. The software driving the computer system is important for overall efficiency of implementation at a system level. The software advantageously will take advantage of the multi-bus structure of the invention. The manipulation of the operation the DMAs is important with respect to the placement of data packets in the system memory.

Figure 5:
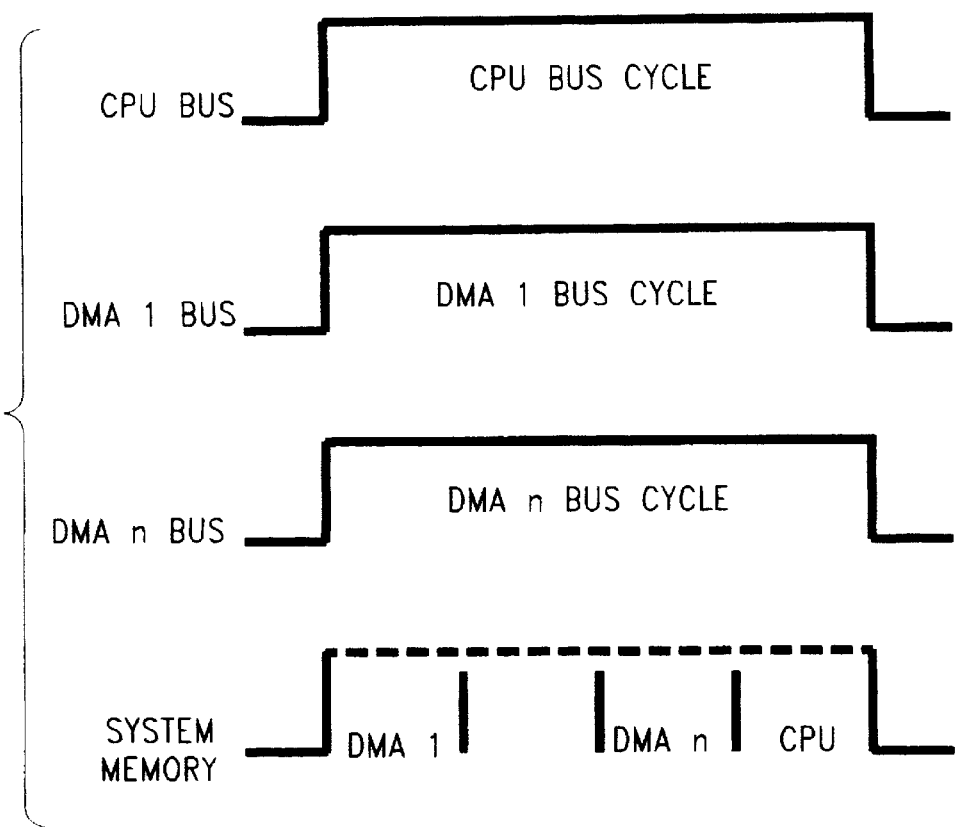
FIG. 5 represents a timing diagram of a data processing system in accordance with the invention for the design depicted in FIG. 4 having one CPU bus and n DMA buses.

The speed of the system memory is also important. The memory used must be fast enough to service both the processor CPU and the DMA concurrently. This needs to be at least twice as fast as conventional memory systems for the depicted in FIG. 3. If concurrent operation of multiple DMAs is desired, the memory will need to be even faster in proportion to the number of DMA channels desired. The architecture of the invention can be extended to the use of a separate bus into the system memory for each DMA channel as shown in FIG. 4 in which n channels are shown. This system will have a very high data throughput rate as there will be no arbitration necessary for the CPU bus or the DMA bus as illustrated in the timing diagram of FIG. 5. In FIG. 3, there is no arbitration for the CPU bus; however, there is arbitration for the DMA bus between the two DMA channels as will well be appreciated by those skilled in the art. DMA channels are well known in the art and need no further discussion.

At the present time, system memory typically employs DRAM (Dynamic Random Access Memory) with speeds of 60 to 70 nanosecond access times. However, by substituting static memory (SRAM) for DRAM, it is possible to achieve memory access times as low as 4 nanoseconds. Currently, the SRAM memory in the 10 to 15 nanosecond range is easily obtainable and it is expected that memory with access times of 4 nanoseconds will be readily available in the near future. The speed of DRAMs are also increasing and, since they are of a lower cost than SRAMs, DRAMs may also be used in this invention in the future.

Hardware System Software

Advantageously, the hardware implementation of the invention herein will employ suitable software described below and depicted in flow charts FIGS. 8, 9 to handle data movement.

Moving Packets Between Different Types of Networks

Referring to FIGS. 8–13; when packets are to be moved between different types of networks, the CPU 5 executes the software which reads the packet header, accessing the packet's routing information and determining where it is to be sent. The CPU will execute the software to build a routing header and insert it immediately in front of the packet header of the packet stored in memory.

Moving a Data Packet from Network A to Network B

Figure 8:
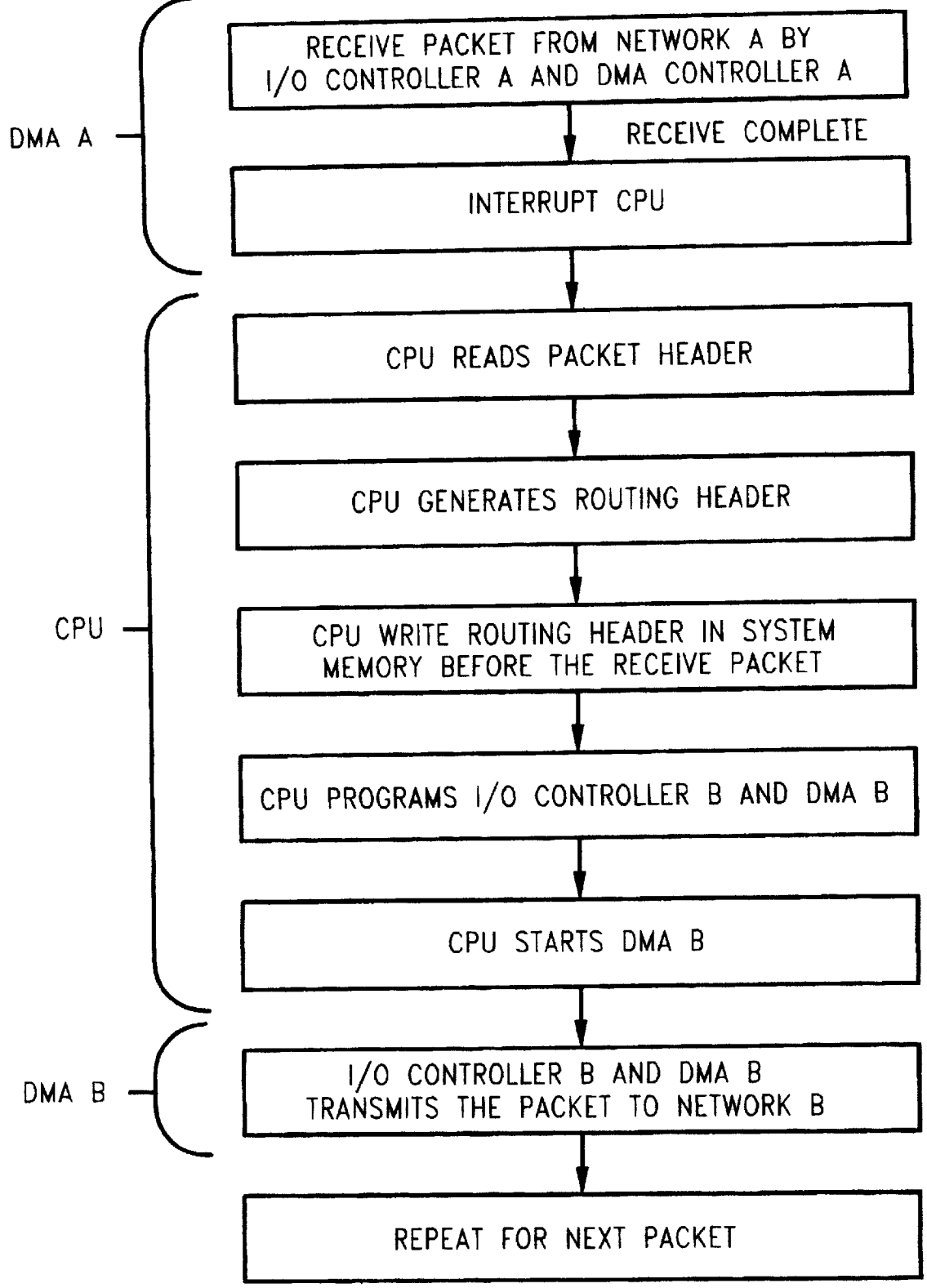
FIG. 8 is a flow chart which describes the operation of the software used with the apparatus of the invention to transfer a packet between two dissimilar networks.
Figure 12:
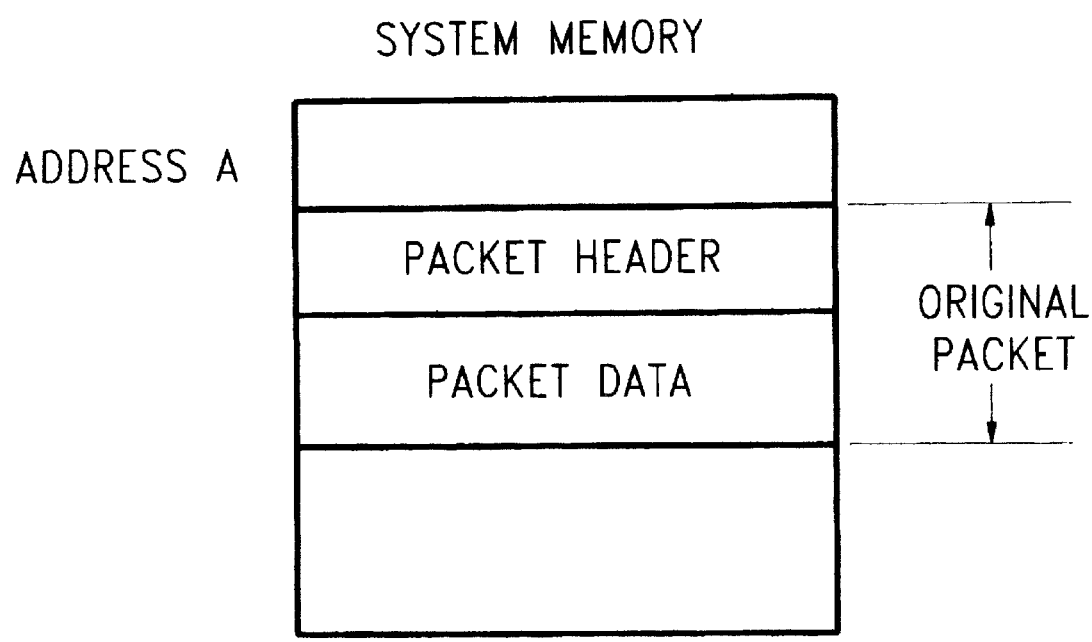
FIG. 12 shows a packed stored in system memory.

An explanation of the movement of a data packet will be done in conjunction with the flow chart depicted in FIG. 8 with the data packet as described in FIG. 12. To minimize movement of data, the DMA A 6 is programmed by the system software to place the incoming data packet from network A 3 into the system memory 2 at a specific location, address B in this example. The processor will fetch and process the packet header at address B. The processor generates and places the routing header at address A in memory just before the data packet header. This modified packet will now reside in contiguous memory in the system memory 2.

The DMA B 7 is programmed with a starting address of A and with the length of the original packet plus the length of the routing header. The modified packet will then be transmitted to network B 8. In this process, the processor has not needed to read the packet data and only a single copy of the packet has resided in system memory. The movement and processing of the packets data itself has been kept to a minimum, enhancing operational speed.

In this situation, the movement of data has been minimized and happens faster than would be the case with the prior art. In the prior art architecture, as depicted in FIG. 1, the movement of data is slowed by the requirement of contention for the CPU bus. In the case of the architecture of FIG. 2, data must be moved from one local memory into the system memory 2 and then into another local memory before it can be transferred. As can well be seen, both of these prior art systems have significant limitations.

Moving Packets Between the Same Types of Networks

Figure 13:
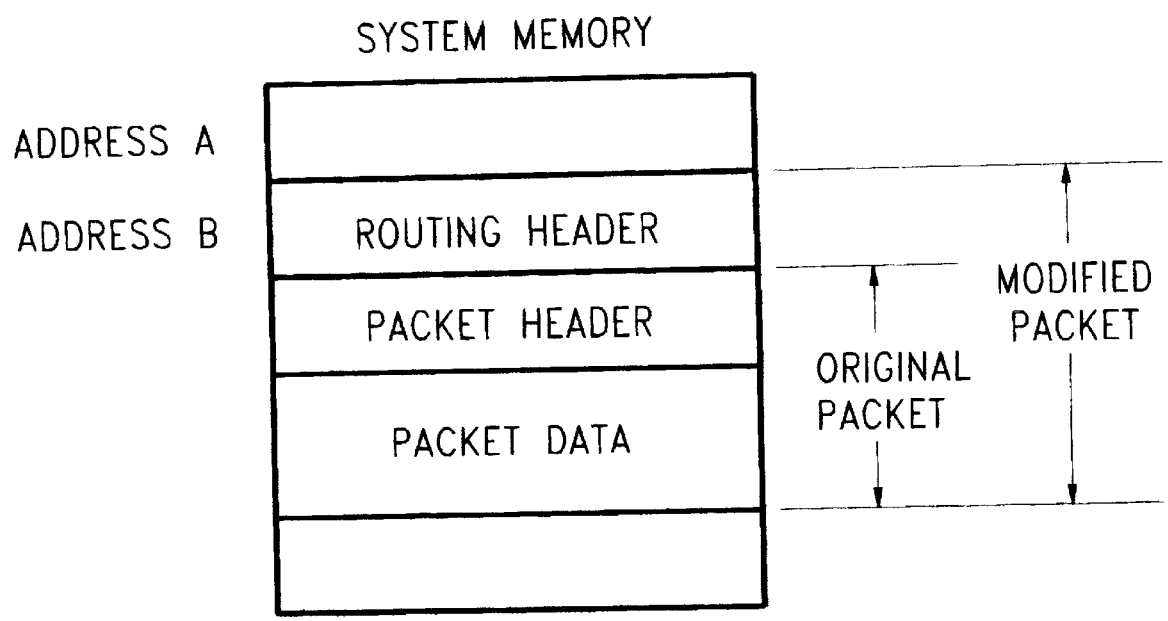
FIG. 13 shows a modified packed stored on system memory.

For transfers between the same type of networks, the CPU will execute the software which reads the packet header, accessing the packet's routing information. FIG. 12 illustrates a packet in system memory. When moving the packet between the same or similar types of networks processor may not need to modify the packet, i.e., no routing header will be required. For example, between two Ethernet networks no modification of the packet is required. With Token Ring networks however, the routing field in the packet header will need to be modified; however, the data portion is not modified. In both cases no additional wrapper, i.e. separate routing header, is needed around the original packet. FIG. 13 illustrates the packet stored in system memory.

Moving a Data Packet from Network A to Network B

Figure 9:
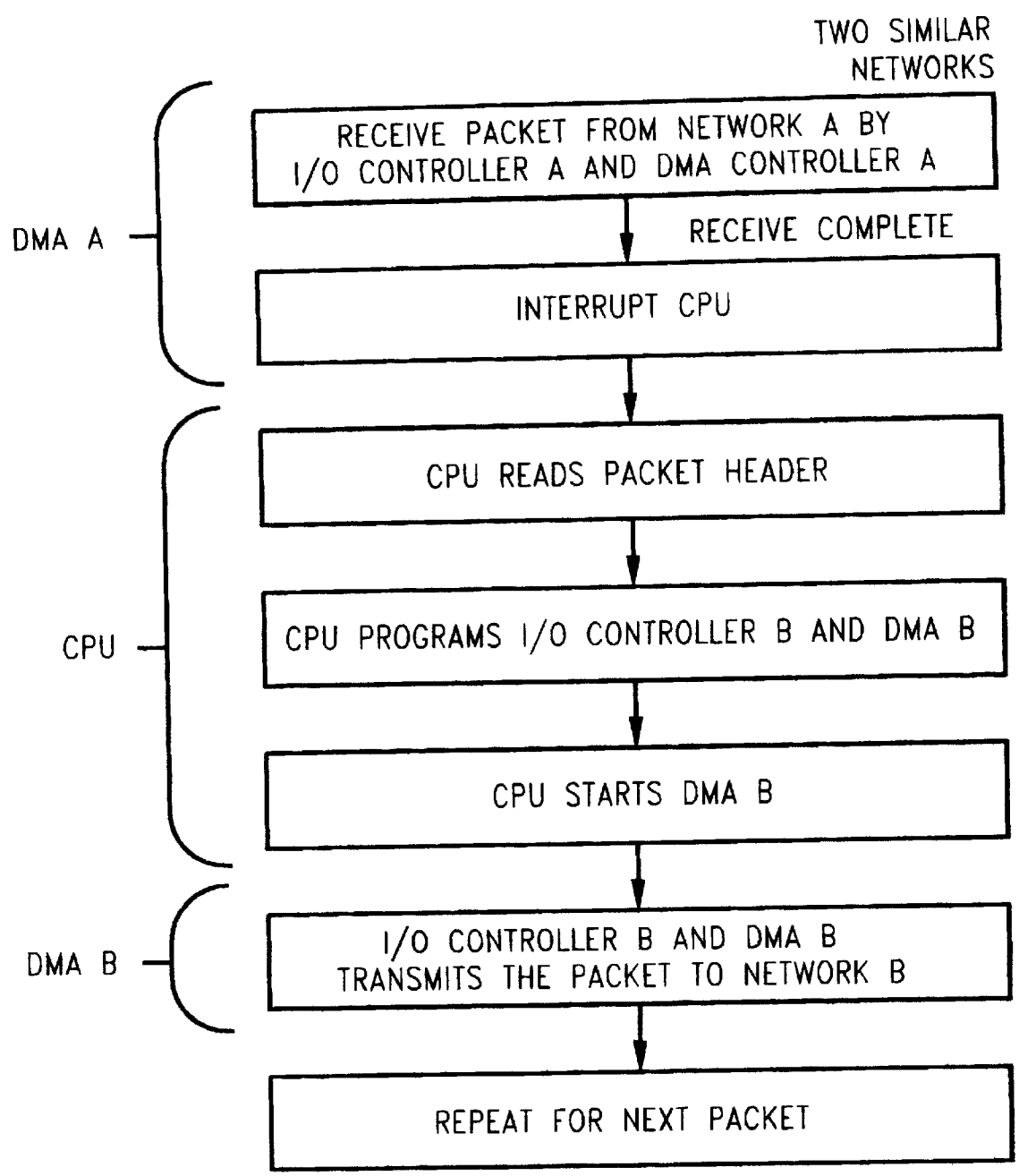
FIG. 9 is a flow chart of the software of the invention which depicts the handling of the packet of information being transferred between two similar networks.

FIG. 9 depicts the process used to move data packets from one network to another similar network. In order to minimize the movement of data in accordance with the invention herein, the DMA A 6 is programmed to place an incoming data packet from network A into the system memory 2 at a specific location, address A, in this example as shown in FIG. 12. The CPU 5 will then fetch and process the packet header found at address A.

DMA B 7 is programmed with a starting address of A and with the length of the original packet. It causes this packet to be transmitted to network B 8. In this process, the processor is not required to read the packet data and, in addition, only a single copy of the packet has resided in the system memory. In this illustration of the invention, the movement and processing of the packets data itself has been kept to a minimum as well appreciated by those skilled in the art.

Configuration for Maximum Data Throughput

Referring to FIG. 4, another implementation of the invention is depicted in which a separate DMA 13, 14 bus has been provided for each DMA controller (i.e., each I/O controller and associated DMA controller which can be connected to a respective network has it's own DMA bus connected to the system memory 2). In accordance with the above description, each DMA is programmed to place incoming data packets from the corresponding network into the system memory at a specific location in the system memory for that DMA controller. The data packet will then be processed in accordance with the description above in order to send it to the network to which it is to be directed.

More specifically, as data packets are being transferred typically from one system to the other in both directions, it is necessary that the system memory be capable of storing a number of data packets. As a data packet is received and stored in memory, the respective I/O controller will inform the CPU of the location of the data packet and its size in the system memory. When the next packet is received, it will be stored in another memory location spaced sufficiently apart from the first packet to permit processing (i.e., to place a routing header/wrapper around the packet) as necessary. In each situation, there still is only one copy of each packet being stored in the system memory; and, it is not required that a copy of the packet be stored anywhere else. The proposed system is simple and efficient and facilitates high speed data packet transfer.

A convenient method of achieving the use of memory by several DMA controllers is for each of the DMA controllers to be assigned a segment of memory, with the DMA controller of each channel assigning an address at which a packet will be stored. Subsequent packets will be stored sequentially to previous packets including an offset sufficient to allow for processing (such as the addition of a routing header/wrapper). It is well known that the DMA can provide for the incrementation of an address in memory by the use of a counter which is incremented as each packet is processed, and then wrap around after a predetermined number of iterations.

Use of System Buses
Prior Art DMA Implementation

Figure 6:
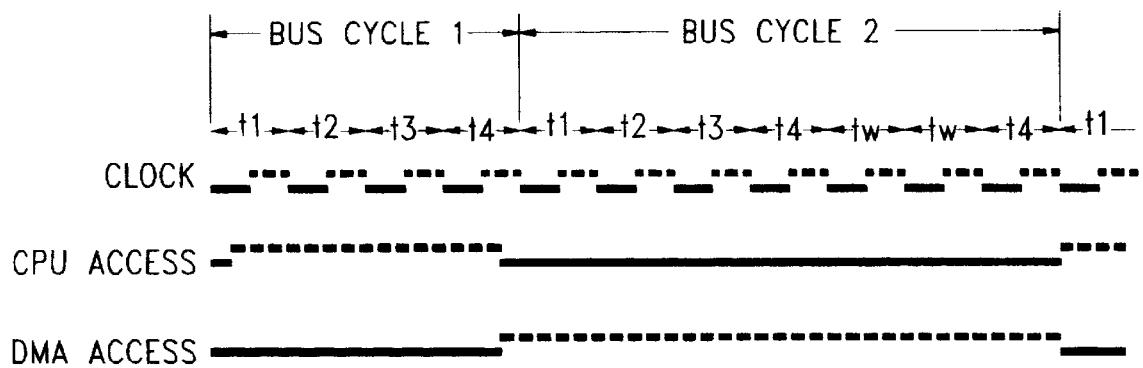
FIG. 6 represents a timing diagram for a prior art system in accordance with FIG. 1.

In the prior art DMA implementation (referring to FIG. 6 which shows a timing diagram for the implementation of FIG. 1) both the CPU 5 and the DMA 6 controller take a full bus cycle to access the system memory. Referring again to FIG. 1, while the CPU accesses the memory in bus cycle 1 shown in FIG. 6, the DMA controller cannot access the memory 2. In bus cycle 2 the CPU 5 cannot access the memory 2 while the DMA controller 6 has the bus 1. The DMA bus cycle is typically longer than the CPU bus cycle due to the arbitration which must take place between the DMA device and the CPU for ownership of the bus. This is indicated by TW, a wait state, which is inserted by the CPU.

Multi-bus DMA Implementation

Figure 7:
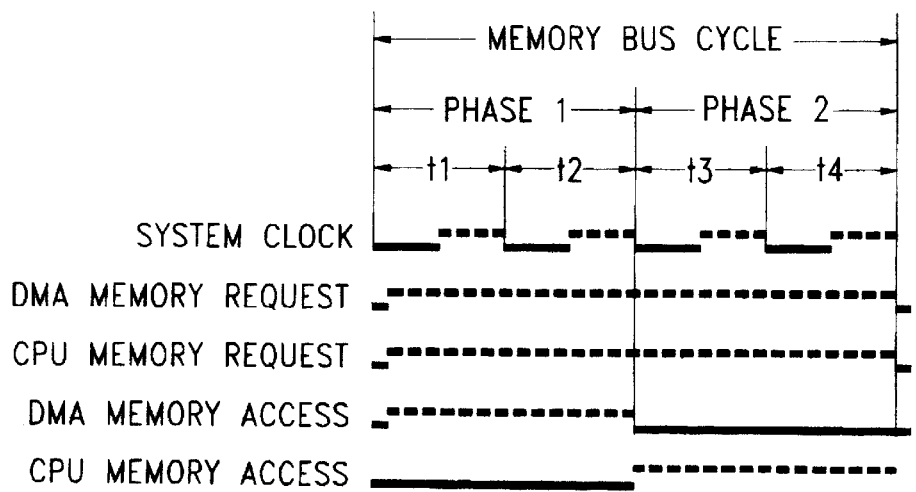
FIG. 7 represents a timing diagram for a system in accordance with the present invention depicted in FIG. 3, having one CPU bus and one DMA bus.

FIG. 7 is a timing diagram which corresponds to that used by the architecture of FIG. 3. Each memory bus cycle is split into two phases with the first phase for the DMA memory access and the second phase for the CPU access. In this way the CPU and DMA can access the memory on each cycle. To each device, the CPU and the DMA controller, it appears that it has exclusive use of the memory sub-system. There is no contention for resources in the system and each device can operate at its optimal speed. In essence, the DMA cycle is hidden from the CPU; (a hidden DMA bus cycle operation). The CPU does not know about the DMA.

As may be seen, one of the advantages is that system bus arbitration time is not necessary as each device has exclusive use of its own bus; the CPU bus for the CPU, and the DMA bus for the DMA controller. Arbitration time disappears as essentially each runs concurrently. In effect, the bus arbitration requirements have been moved into the memory so the memory must be fast enough to respond to requests from the DMA controllers and the CPU.

FIG. 7 shows a typical memory bus cycle. As can be seen, from the diagram, neither the DMA controller nor the CPU can see, or is effected by, requests made by the other device.

Figure 10:
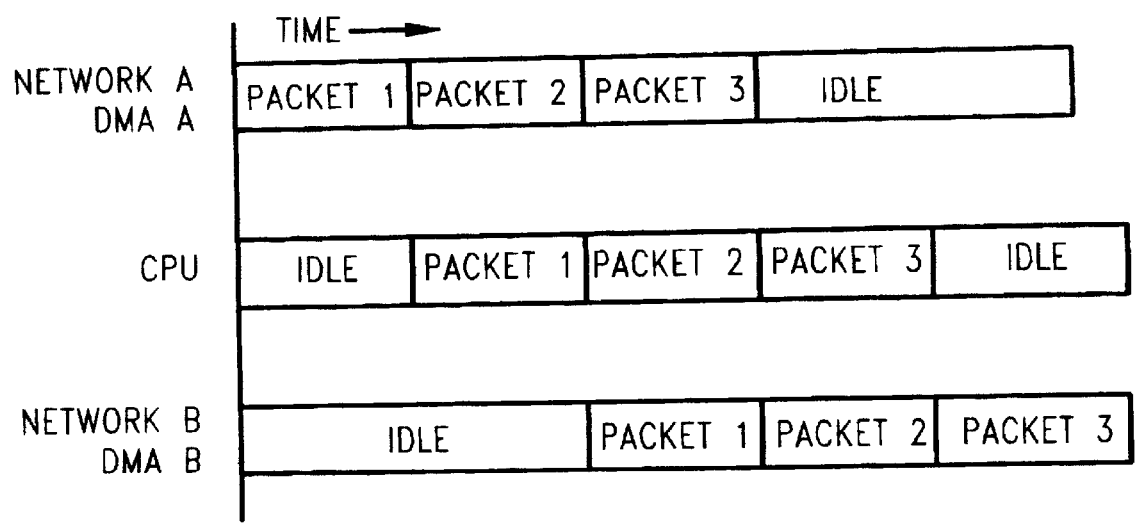
FIG. 10 depicts a time line diagram showing the processing of packets transferred between a network A and a network B by the system depicted in FIG. 3.

FIG. 10 depicts a timing diagram for the handling of packets being transmitted from one network, network A, to another network, network B). This timing diagram corresponds to the processes depicted in the flow charts of FIGS. 8 and 9 for the architecture shown in FIG. 3. From FIG. 10, it can be seen that when a packet one is received under DMA control A from network A, packet 1 is stored into system memory. Subsequently, CPU processes packet 1 which is then sent under DMA control of DMA B to network B. At the same time as the CPU is processing packet 1, packet 2 is being received under DMA control. It is then processed by the CPU after packet 2 and forwarded under the control of DMA controller B to network B. This process is repeated continually for all packets being received and transmitted.

Figure 11:
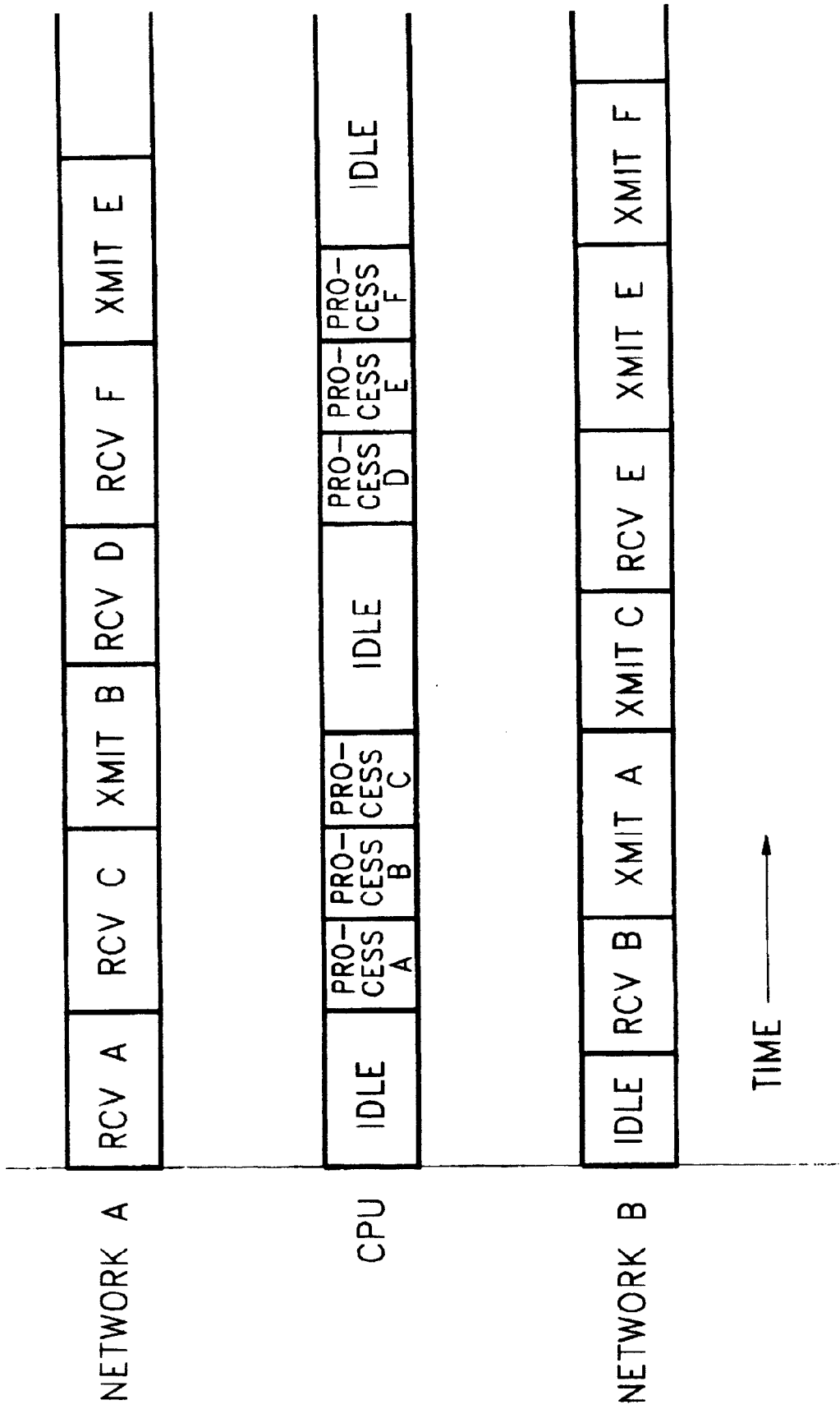
FIG. 11 shows a time line diagram for a system depicted in FIG. 3 in which data packets are being transmitted in both directions, i.e., from network A to network B and from network B to network A.

FIG. 11 is a timing diagram related to the handling of data packets which are being transferred between network A and B and vice versa corresponding to the processes indicated in the flow charts FIGS. 8 and 9 for the architecture of FIG. 3. Referring to FIG. 11, packet A is received from network A; then processed by the CPU, and subsequently transmitted to network B. While a packet received from network A is being processed by the CPU, packet B is being received from network B under the control of DMA controller B, subsequently processed by the CPU, and transmitted to network A under the control of DMA controller A. This process is repeated as many times as required to process packets from all networks.

As can be seen in both of the examples above, the efficient handling and transmission of data packets is achieved without waiting for bus arbitration and without transferring data packet information from one memory or memory location to another.

While the present invention has been described with reference to a few specific embodiments, the description is illustrative of the invention and is not to be construed as illuminating the invention. The various modifications made referred to those skilled in the art without departing the true spirit and scope of the invention as defined by the appended claims.

The embodiments of the invention in which an exclusive property or privilege is claimed are defined as follows:

1. A data processing system comprising:
    a CPU for data processing comprising at least processing headers of data packets;
    a system memory;
    a plurality of network interface means, each of said network interface means adapted for connection to an external network for receiving data packets, for providing data packets for storage, at said system memory, and for providing data packet header information to said CPU;
    a CPU bus connected to said system memory and to each of said network interface means for initialization and control of said network interface means by said CPU; and
    an individual DMA bus connected to each of said plurality of network interface means and to said system memory;
    whereby data can be transferred by said data processing system from one network to another by said network interface means transferring data packets with processed packet headers along said DMA bus simultaneous with operation of said CPU.

2. The apparatus of claim 1 wherein each said network interface means comprises a DMA controller and associated I/O controller.

3. The apparatus of claim 2 wherein said DMA controller is connected to said DMA bus, and said I/O controller is connectable to said external network.

4. A data processing system comprising:
    a system memory for storing data packets including packet headers;
    a CPU for data processing comprising at least processing of said packet headers to provide processed packet headers;

a plurality of network interface means, each of said network interface means adapted for connection to an external network and for receiving said data packets, for providing data packets for storage at said system memory, and for providing data packet header information to said CPU;

a CPU bus connected to said system memory and to each of said network interface means for initialization and control of said network interface means by said CPU; and more than one DMA buses connected to said plurality of network interface means and to said system memory;

whereby data having processed packet headers can be transferred by said data processing system from one network to another by said network interface means using said system memory and at least one of said more than one DMA buses, simultaneous with CPU operation.

5. The apparatus of claim 4 wherein each said network interface means comprises a DMA controller and associated I/O controller.

6. The apparatus of claim 5 wherein each said DMA controller is connected to one of said more than one DMA buses, and said I/O controller is connectable to an external network.

7. A method of transferring data between networks by means of a data processing system having a system controller, a system bus, a system memory, plurality of network interface means for receiving said data from said networks and at least one DMA bus connected between at least one of said plurality of network interface means and said system memory, said data comprising data packets each having a packet header, comprising the steps of:

at least one of said plurality of network interface means transferring each one of said data packets to said system memory;

said system controller processing the data header of each one of aid data packets; and at least one of said plurality of network interface means transmitting each one of said data packets from said system memory to one of said networks along said at least one DMA bus, wherein said transferring and said transmitting occur simultaneously to system bus operations of said system controller.

8. The method of claim 7 wherein each of said network interface means comprises a DMA controller and associated I/O controller and wherein said transferring comprises said DMA controller assigning a system memory address to said data packet header and moving said data packet to said system memory address.

9. The method of claim 8 further comprising said I/O controller informing said system controller of the address and length of said data packet.

10. The method of claim 7 wherein said networks are dissimilar and wherein said system controller processing the data header of each one of said data packets comprises adding a routing header to said data header.

11. The method of claim 10 wherein said data packet is stored at a specific address in said system memory and wherein said processing further comprises storing said routing header at a system memory location contiguous to said specific address.

12. The method of claim 10 wherein said networks are dissimilar and wherein said system controller processing the data header of each one of said data packets comprises adding a routing header to said data header and storing said routing header at a system memory location contiguous to said specific address.

13. The method of claim 7 wherein said system controller accesses said system memory along said system bus during a first phase of said memory bus cycle and said DMA controller accesses said system memory along said at least one DMA bus during a second phase of said memory bus cycle, and wherein said system controller can access said system bus while said network interface means is accessing said at least one DMA bus.

14. A method of transferring data between networks by means of a data processing system having a system controller, a system bus, a system memory, a plurality of network interface means for receiving said data from said networks, and at least one DMA bus connected between said plurality of network interface means and said system memory, said data comprising data packets each having a packet header, comprising the steps of:

receiving said packet from a first of said networks at one of said plurality of network interface means;

said network interface means assigning a system memory address to said data packet;

said network interface means accessing said DMA bus;

said network interface means transferring said data packet to said address at said system memory along said DMA bus;

said network interface means providing said address and length of said data packet to said system controller;

said system controller processing the data header of said data packet; and said network interface means transmitting said data packet from said system memory to a second of said networks along said DMA bus.

15. The method of claim 14 wherein said networks are dissimilar and wherein said system controller processing the data header of said data packet comprises adding a routing header to said data header.

16. The method of claim 15 wherein said system controller can access said system bus simultaneous to said transferring along said DMA bus.

17. The method of claim 15 wherein said system controller can access said system bus simultaneous to said transmitting along said DMA bus.

18. The method of claim 14 wherein said system controller can access said system bus simultaneous to said transferring along said DMA bus.

19. The method of claim 14 wherein said system controller can access said system bus simultaneous to said transmitting along said DMA bus.

20. The method of claim 15 wherein said system controller accesses said system memory along said system bus during a first phase of said memory bus cycle and said DMA controller accesses said system memory along said at least one DMA bus during a second phase of said memory bus cycle, and wherein said system controller can access said system bus while said network interface means is accessing said at least one DMA bus.

21. A data processing system comprising:

a CPU;

a system memory having a two phase system memory bus cycle;

a plurality of network interface means, each of said network interface means adapted for connection to an external network;

a CPU bus connected to said system memory and to each of said network interface means for initialization and control of said network interface means by said CPU; and at least one DMA bus connected to said plurality of network interface means and to said system memory;

whereby data can be transferred by said data processing system from one network to another using said system memory and wherein said system memory is accessed by said CPU during a first phase of said two phase system memory bus cycle and accessed by said network interface means during a second phase of said two phase system memory bus cycle.

22. The system of claim 21 wherein data can be transferred by said data processing system from one network to another by said network interface means transferring data packets with CPU-processed packet headers along said DMA bus simultaneous with operation of said CPU.

23. A data processing method for transferring data between networks by a data processing system having a system controller, a system bus, a system memory, a plurality of network interface means and at least one DMA bus, comprising the steps of:

storing said data at said system memory;

processing said data by said system controller accessing said system memory along said system bus;

transferring data by at least one of said plurality of network interface means accessing said system memory along said DMA bus;

wherein said system controller accesses said system memory along said system bus during a first phase of said memory bus cycle and said DMA controller accesses said system memory along said at least one DMA bus during a second phase of said memory bus cycle, and wherein said system controller can access said system bus while said network interface means is accessing said at least one DMA bus.

* * * * *